US008599871B2

(12) United States Patent
Sayeedi et al.

(10) Patent No.: US 8,599,871 B2
(45) Date of Patent: Dec. 3, 2013

(54) METHOD AND APPARATUS FOR CROSS PAGING A MULTI NETWORK COMMUNICATION SYSTEM

(75) Inventors: Shahab M. Sayeedi, Naperville, IL (US); Ronald T. Crocker, St. Charles, IL (US); Xiang Xu, Nanjing (CN)

(73) Assignee: Motorola Mobility LLC, Libertyville, IL (US)

( * ) Notice: Subject to any disclaimer, the term of this patent is extended or adjusted under 35 U.S.C. 154(b) by 1073 days.

(21) Appl. No.: 11/466,537

(22) Filed: Aug. 23, 2006

(65) Prior Publication Data

US 2007/0047562 A1 Mar. 1, 2007

Related U.S. Application Data

(60) Provisional application No. 60/713,113, filed on Aug. 31, 2005.

(51) Int. Cl.
*H04B 7/212* (2006.01)
(52) U.S. Cl.
USPC ............................................................ 370/443
(58) Field of Classification Search
USPC ......... 370/320, 322, 328, 329, 331, 335, 341, 370/342, 441, 479
See application file for complete search history.

(56) References Cited

U.S. PATENT DOCUMENTS

| 4,723,238 | A | 2/1988 | Isreal et al. |
| 6,411,416 | B1 | 6/2002 | Ooi et al. |
| 6,438,370 | B1 * | 8/2002 | Einola et al. ............... 455/422.1 |
| 6,625,169 | B1 | 9/2003 | Tofano |
| 6,747,970 | B1 | 6/2004 | Lamb et al. |
| 2004/0090951 | A1 * | 5/2004 | Jung .............................. 370/352 |
| 2004/0185879 | A1 * | 9/2004 | Kong et al. .................... 455/458 |
| 2004/0198349 | A1 * | 10/2004 | Chin .......................... 455/432.1 |
| 2005/0141464 | A1 * | 6/2005 | Willey et al. .................. 370/337 |
| 2005/0153697 | A1 * | 7/2005 | Patel ............................ 455/442 |
| 2005/0276273 | A1 * | 12/2005 | Oprescu-Surcobe et al. 370/401 |
| 2006/0062207 | A1 | 3/2006 | Julka et al. |
| 2006/0109817 | A1 * | 5/2006 | Ramanna et al. ............. 370/331 |

(Continued)

FOREIGN PATENT DOCUMENTS

| EP | 1392067 A1 | 2/2004 |
| EP | 0973352 B1 | 11/2006 |
| WO | 2004112416 A1 | 12/2004 |

OTHER PUBLICATIONS

Supplementary European Search Report, The Hague, Dec. 27, 2011, all pages.

*Primary Examiner* — Gregory Sefcheck
*Assistant Examiner* — Amar Persaud

(57) ABSTRACT

Various embodiments are described which can serve to increase the cross paging call success rate in joint networks. Resource reservation by a requesting network (312) in the context of cross paging is described. In general, such resource reservation may be triggered by the occurrence of any one of a variety of events in conjunction with the requesting network determining that a communication session with an AT (301) is desirable. Examples of triggering events include the following: the AT subscribing for resource reservation as a matter of configuration, the AT having a particular call state and perhaps with regard to particular services, the AT requesting resource reservation (before or after being paged/notified of the requesting network's desire to provide service, the communication session for which the requesting network is requesting the AT is of a particular type, and/or resource reservation is an operational default system operation.

12 Claims, 11 Drawing Sheets

(56) References Cited

U.S. PATENT DOCUMENTS

| | | | |
|---|---|---|---|
| 2006/0182069 A1* | 8/2006 | Yu | 370/335 |
| 2008/0070498 A1* | 3/2008 | Tan et al. | 455/13.1 |
| 2008/0076432 A1* | 3/2008 | Senarath et al. | 455/442 |

* cited by examiner

| EVENT NOTIFICATION MESSAGE INFORMATION ELEMENT | ELEMENT DIRECTION |
|---|---|
| MESSAGE TYPE | MSC -> AN |
| MOBILE IDENTITY (IMSI) | MSC -> AN |
| EVENT | MSC -> AN |

720

| 7 | 6 | 5 | 4 | 3 | 2 | 1 | 0 | OCTET |
|---|---|---|---|---|---|---|---|---|
| A1 ELEMENT IDENTIFIER = [7EH] | | | | | | | | 1 |
| LENGTH | | | | | | | | 2 |
| EVENT IDENTIFIER | | | | | | | | 3 |

730

| BINARY VALUES | MEANING |
|---|---|
| 0000 0001 | 1x REGISTRATION |
| 0000 0010 | 1x POWER DOWN |
| 0000 0010 | 1x MS/AT IS BUSY |
| 0000 0010 | 1x MS/AT IS IDLE |
| 0000 0011 | HRPD MS/AT ACTIVE PACKET DATA STATE |
| 0000 0100 | HRPD MS/AT DORMAN PACKET DATA STATE |
| 0000 0101 | MS/AT LOCATION INFORMATION |
| 0000 0110 | MS/AT IS SUBSCRIBED FOR RESOURCE RESERVATION |
| ALL OTHER VALUES ARE RESERVED | |

| BS SERVICE REQUEST INFORMATION ELEMENT | DIRECTION ELEMENT |
|---|---|
| MESSAGE TYPE | BS -> MSC |
| MOBILE IDENTITY (IMSI) | BS -> MSC |
| MOBILE IDENTITY (ESN) | BS -> MSC |
| SERVICE OPTION | BS -> MSC |
| TAG | BS -> MSC |
| ADDS USER PART | BS -> MSC |
| SERVICE REFERENCE IDENTIFIER (SR_ID) | BS -> MSC |
| MOBILE IDENTITY (MEID) | BS -> MSC |
| RR INDICATION | BS -> MSC |

*FIG. 8*

| BS SERVICE RESPONSE INFORMATION ELEMENT | ELEMENT DIRECTION |
|---|---|
| MESSAGE TYPE | MSC -> BS |
| MOBILE IDENTITY (IMSI) | MSC -> BS |
| MOBILE IDENTITY (ESN) | MSC -> BS |
| TAG | MSC -> BS |
| CAUSE | MSC -> BS |
| MOBILE IDENTITY (MEID) | MSC -> BS |
| LOCATION INFORMATION | MSC -> BS |

*FIG. 9*

| PAGING REQUEST INFORMATION ELEMENT | ELEMENT DIRECTION |
|---|---|
| MESSAGE TYPE | MSC -> BS |
| MOBILE IDENTITY (IMSI/ESN) | MSC -> BS |
| TAG | MSC -> BS |
| CELL IDENTIFIER LIST | MSC -> BS |
| SLOT CYCLE INDEX | MSC -> BS |
| SERVICE OPTION | MSC -> BS |
| *IS-2000* MOBILE CAPABILITIES | MSC -> BS |
| PROTOCOL REVISION | MSC -> BS |
| MS DESIGNATED FREQUENCY | MSC -> BS |
| A2p BEARER FORMAT-SPECIFIC PARAMETERS | MSCe -> BS |
| RR INDICATION | MSC -> BS |
| RR REQUEST | MSC -> BS |

| PAGING RESPONSE INFORMATION ELEMENT | ELEMENT DIRECTION |
|---|---|
| PROTOCOL DISCRIMINATOR | BS -> MSC |
| RESERVED - OCTET | BS -> MSC |
| MESSAGE TYPE | BS -> MSC |
| CLASSMARK INFORMATION TYPE 2 | BS -> MSC |
| MOBILE IDENTITY (IMSI) | BS -> MSC |
| TAG | BS -> MSC |
| MOBILE IDENTITY (ESN) | BS -> MSC |
| SLOT CYCLE INDEX | BS -> MSC |
| AUTHENTICATION RESPONSE PARAMETER (AUTHR) | BS -> MSC |
| AUTHENTICATION CONFIRMATION PARAMETER (RANDC) | BS -> MSC |
| AUTHENTICATION PARAMETER COUNT | BS -> MSC |
| AUTHENTICATION CHALLENGE PARAMETER (RAND) | BS -> MSC |
| SERVICE OPTION | BS -> MSC |
| VOICE PRIVACY REQUEST | BS -> MSC |
| CIRCUIT IDENTITY CODE | BS -> MSCcs |
| AUTHENTICATION EVENT | BS -> MSC |
| RADIO ENVIRONMENT AND RESOURCES | BS -> MSC |
| USER ZONE ID | BS -> MSC |
| IS-2000 MOBILE CAPABILITIES | BS -> MSC |
| CDMA SERVING ONE WAY DELAY | BS -> MSC |
| SERVICE OPTION CONNECTION IDENTIFIER (SOCI) | BS -> MSC |
| MOBILE IDENTITY (MEID) | BS -> MSC |
| A2p BEARER SESSION-LEVEL PARAMETERS | BS -> MSCe |
| A2p BEARER FORMAT-SPECIFIC PARAMETERS | BS -> MSCe |
| RR INDICATION | BS -> MSC |
| RR REQUEST | BS -> MSC |

*FIG. 12*

METHOD AND APPARATUS FOR CROSS PAGING A MULTI NETWORK COMMUNICATION SYSTEM

REFERENCE(S) TO RELATED APPLICATION(S)

The present application claims priority from provisional application, Ser. No. 60/713,113, entitled "METHOD AND APPARATUS FOR CROSS PAGING IN A MULTI-NETWORK COMMUNICATION SYSTEM," filed Aug. 31, 2005, which is commonly owned and incorporated herein by reference in its entirety.

This application is related to a co-pending provisional application, Ser. No. 60/678,063, entitled "CROSS-PAGING BETWEEN COMMUNICATION NETWORKS," filed May 5, 2005, which is incorporated herein by reference in its entirety.

This application is related to a co-pending provisional application, Ser. No. 60/681,941, entitled "METHOD AND APPARATUS FOR AN EXCHANGE OF PACKET DATA BETWEEN A WIRELESS ACCESS TERMINAL AND A PACKET SWITCHED COMMUNICATION SYSTEM VIA A CIRCUIT SWITCHED COMMUNICATION SYSTEM," filed May 16, 2005, which is incorporated herein by reference in its entirety.

FIELD OF THE INVENTION

The present invention relates generally to communications and, in particular, to cross paging in multi-network communication systems.

BACKGROUND OF THE INVENTION

Third Generation Partnership Project 2 (3GPP2) Code Division Multiple Access (CDMA), known as 3GPP2 cdma2000, networks support concurrent services functionality for packet data and circuit switched voice communication. The original system supports packet data and circuit switched voice communication and is commonly referred to as the cdma2000 1X system or the 3G1X system. The cdma2000 1X system air interface is standardized in 3GPP2 document C.S0001 through C.S0005 and corresponding Telecommunication Industry Associates (TIA) standard TIA-2000. In addition, new packet data standards, such as cdma2000 High Rate Packet Data (cdma2000 HRPD) have been created. The cdma2000 HRPD air interface is standardized in 3GPP2 documents C.S0024-A and C.S0063.

To provide communication continuity for a wireless unit moving between overlaid 1x and packet data networks, it is desirable to provide cross-paging capabilities that enable the wireless unit to be notified of incoming 1x circuit voice calls when the unit is operating on the HRPD network and that notify the unit of incoming packet data in the HRPD packet data network when the unit is operating on the 1X network. U.S. patent application publication no. 2004/0120283 can be referenced for a description of certain aspects of cross-paging functionality. A 3GPP2 architecture which supports cross paging typically includes a Mobile Switching Center (MSC), a 1x BS (Base Station), an HRPD AN (Access Network or Access Node), an HRPD PCF (Packet Control Function), and a Packet Data Serving Node (PDSN) and is standardized for two different RAN architectures in 3GPP2, A.S0008-A and A.S0009.

Hybrid Access Terminals (HATs) are capable of supporting both the 3G1x and HRPD air interface technologies. In a joint circuit switched, packet switched communication network, such as the 3GPP2 3G1x-HRPD network (in which the 3G1x network provides circuit switched voice support and the HRPD network provides packet switched service), cross paging is used to page a HAT on the network where it is currently monitoring a forward link channel. Thus, cross paging is used to inform the HAT of a call on another network where the HAT is registered for service but not currently monitoring a forward link channel.

When a HAT is paged for service on a second network via a first network, it releases any active call on the first network and begins monitoring a forward link on the second network, from which it is being paged, to complete the call. For example, a HAT may be paged for circuit voice service from the 3G1x network while the HAT is in the HRPD network, currently engaged in an active packet data call. Alternatively, the HAT may be paged for packet data service from the HRPD network while in the 3G1x network monitoring a forward link channel.

When a HAT is cross paged for service in another network, a condition known as 'ghost ring' may occur. A 'ghost ring' occurs when the HAT responds to a page from a second network while in the first network, terminates any active call in the first network, and attempts to initiate the new call for which it was paged but fails because network resources required to support the call (e.g., air traffic channels or network bearer connections) are not available in the second network (even though they may have been available when the HAT was originally paged, as may occur in networks operating at or near full capacity). When such a scenario occurs, not only does the HAT fail to successfully initiate the call in the second network, but it also may have dropped an existing call in the first network to receive the new call. Generally, then, this is a problem in cross paging architectures where each RAN independently manages its network resources.

FIG. 1 is a signaling flow diagram 10 depicting, in accordance with the prior art (see the 3GPP2-A.S0008-A standard, May 2005 V&V version), a HAT being paged for HRPD packet data service via a 1x network air interface while the HAT is engaged in a circuit voice call. The HAT is registered in the 1x system and on a traffic channel when packet data for the HAT arrives at the HRPD AN/PCF supporting the HAT's packet data session in the packet data network. The arrival of data at the HRPD access network triggers an HRPD cross page in the 1x network.

In prior art signaling 11, it is assumed that, when the HAT arrives on the HRPD network after releasing its circuit call, a connection will successfully be established between the HAT and the HRPD network. However, if for any reason the connection fails to be established due to a lack of network resources, not only will the new call fail to be delivered in the HRPD network, but the 1x circuit call will also have been unnecessarily dropped.

Operators are beginning to deploy Voice over Internet Protocol (VoIP) and Video Telephony (VT) on their HRPD packet data networks and will rely on cross paging to page HATs for packet data service in the 3G1X circuit network. Therefore, a need exists to increase the cross-paging call success rate in joint networks such as the 3GPP2 3G1X-HRPD communication networks.

BRIEF DESCRIPTION OF THE DRAWINGS

FIG. 7 is a block diagram depicting an illustrative message definition for an event notification message in accordance with multiple embodiments of the present invention.

FIG. 8 is a block diagram depicting an illustrative message definition for a service request message in accordance with multiple embodiments of the present invention.

FIG. 9 is a block diagram depicting an illustrative message definition for a service response message in accordance with multiple embodiments of the present invention.

FIG. 11 is a block diagram depicting an illustrative message definition for a paging request message in accordance with multiple embodiments of the present invention.

FIG. 12 is a block diagram depicting an illustrative message definition for a paging response message in accordance with multiple embodiments of the present invention.

Specific embodiments of the present invention are disclosed below with reference to FIGS. 2-12. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams above are described and shown with reference to specific signaling in a specific order, some of this signaling may be omitted or some may be combined, sub-divided, or reordered without departing from the scope of the claims. Thus, unless specifically indicated, the order and grouping of signaling is not a limitation of other embodiments that may lie within the scope of the claims Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described which can serve to increase the cross paging call success rate in joint networks such as the 3GPP2 3G1X-HRPD communication networks. Resource reservation by a requesting network in the context of cross paging is described. In general, such resource reservation may be triggered by the occurrence of any one of a variety of events in conjunction with the requesting network determining that a communication session with an AT is desirable. Examples of triggering events include the following: the AT subscribing for resource reservation as a matter of configuration, the AT having a particular call state and perhaps with regard to particular services, the AT requesting resource reservation (before or after being paged/notified of the requesting network's desire to provide service, the communication session for which the requesting network is requesting the AT is of a particular type, and/or resource reservation is an operational default system operation.

Figure 1:
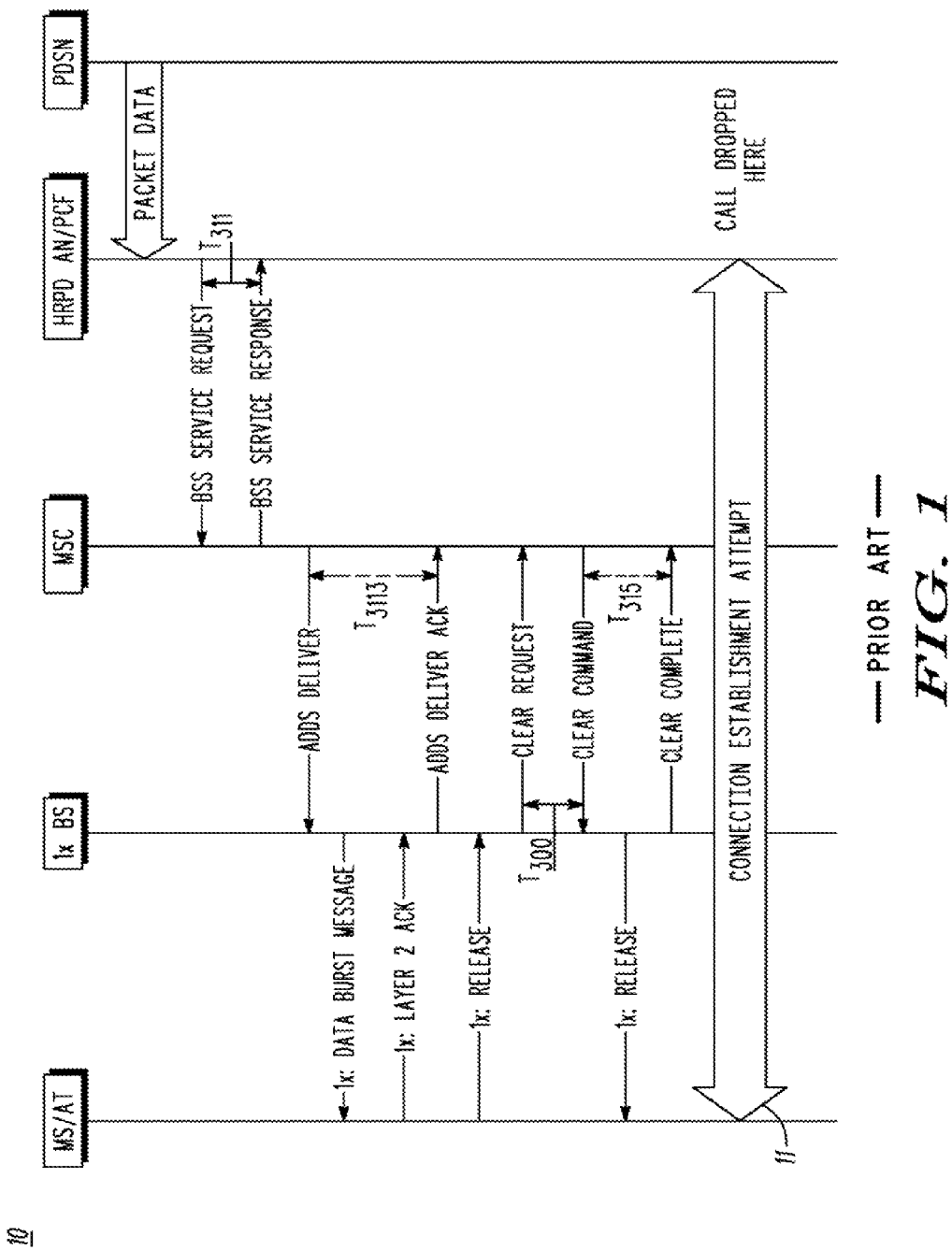
FIG. 1 is a signaling flow diagram depicting, in accordance with the prior art, a HAT being paged for HRPD packet data service via a 1x network air interface while the HAT is engaged in a circuit voice call.
Figure 2:
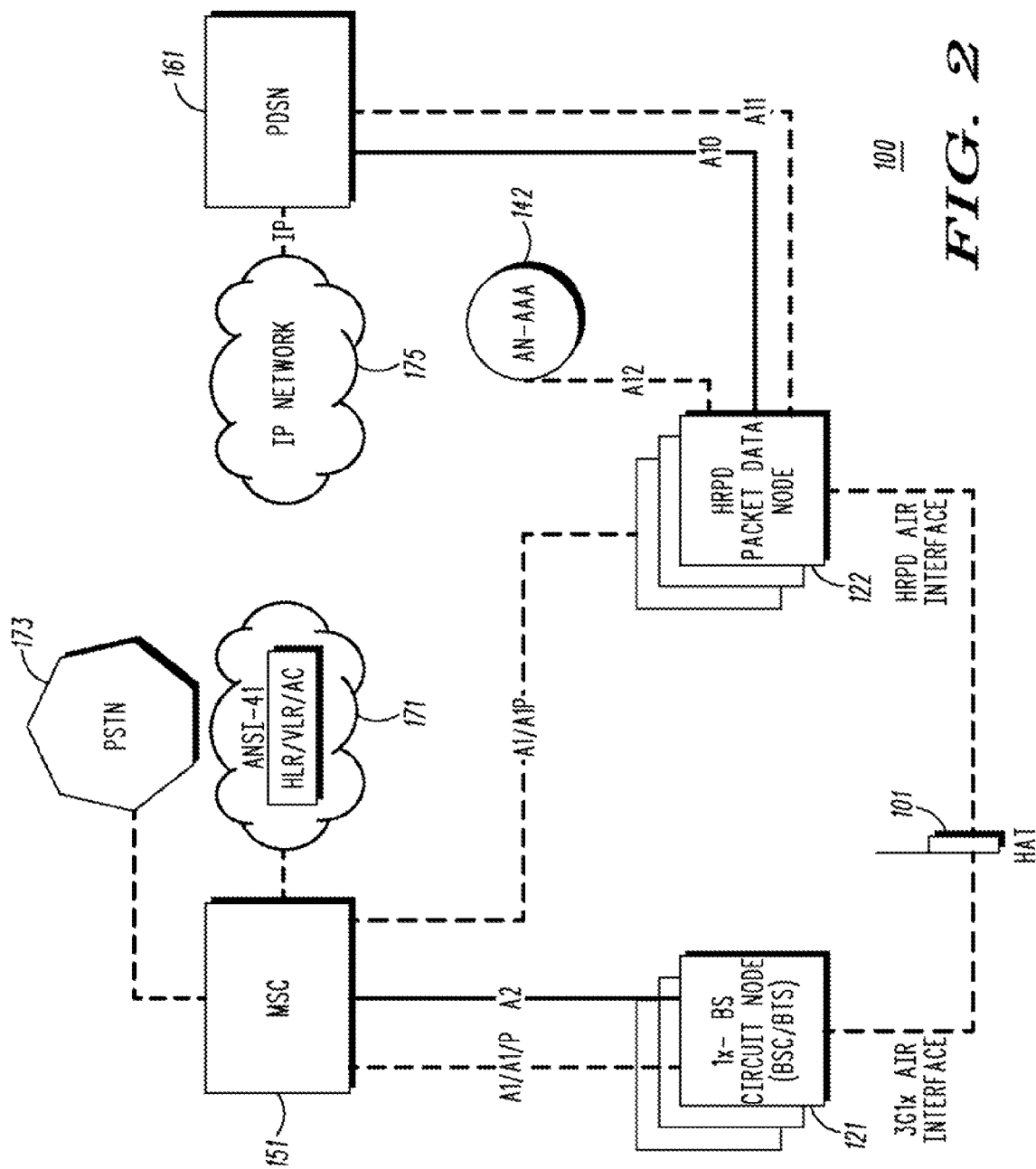
FIG. 2 is a block diagram depiction of a wireless communication system in accordance with multiple embodiments of the present invention.

The disclosed embodiments can be more fully understood with reference to FIGS. 2-12. FIG. 2 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having an architecture in accordance with multiple 3GPP2 technologies cdma2000 1X (also known as 3G1X) and HRPD (also known as 1xEV-DO or IS-856)), suitably modified to implement the present invention. For example, nodes 121 and 122 have architectures in accordance with 1X and HRPD, respectively, which are suitably modified to implement the present invention.

Alternative embodiments of the present invention may be implemented in communication systems that employ other or additional technologies such as, but not limited to, others described in the 3GPP2 specifications, those described in the 3GPP specifications (e.g., GSM, GPRS, EDGE, W-CDMA, UTRAN, FOMA, UMTS, HSDPA, and HSUPA), those described in the IEEE's 802.xx specifications, those described in the OMA standards specifications, those described in the IS-136 (TDMA Third Generation Wireless Standards) specification, those described in the IS-95 (CDMA) specification, 1xEV-DV technologies, and integrated dispatch enhanced network technologies.

More specifically, communication system 100 comprises HAT 101, nodes 121 and 122, Access Network Authentication, Authorization and Accounting (AN-AAA) entity 142, Mobile Switching Center (MSC) 151, Packet Data Serving Node (PDSN) 161, TIA-41 network 171, public switched telephone network (PSTN) 173, and IP-network 175. Those skilled in the art will recognize that FIG. 2 does not depict all of the network equipment necessary for system 100 to operate but only those system components and logical entities particularly relevant to the description of embodiments herein. For example, 1X circuit node 121 is known to comprise devices such as base transceiver stations (BTSs) and base site controllers (BSCs), and packet data node 122 is known to comprise devices such as access networks (ANs) and packet control functions (PCFs).

Figure 3:
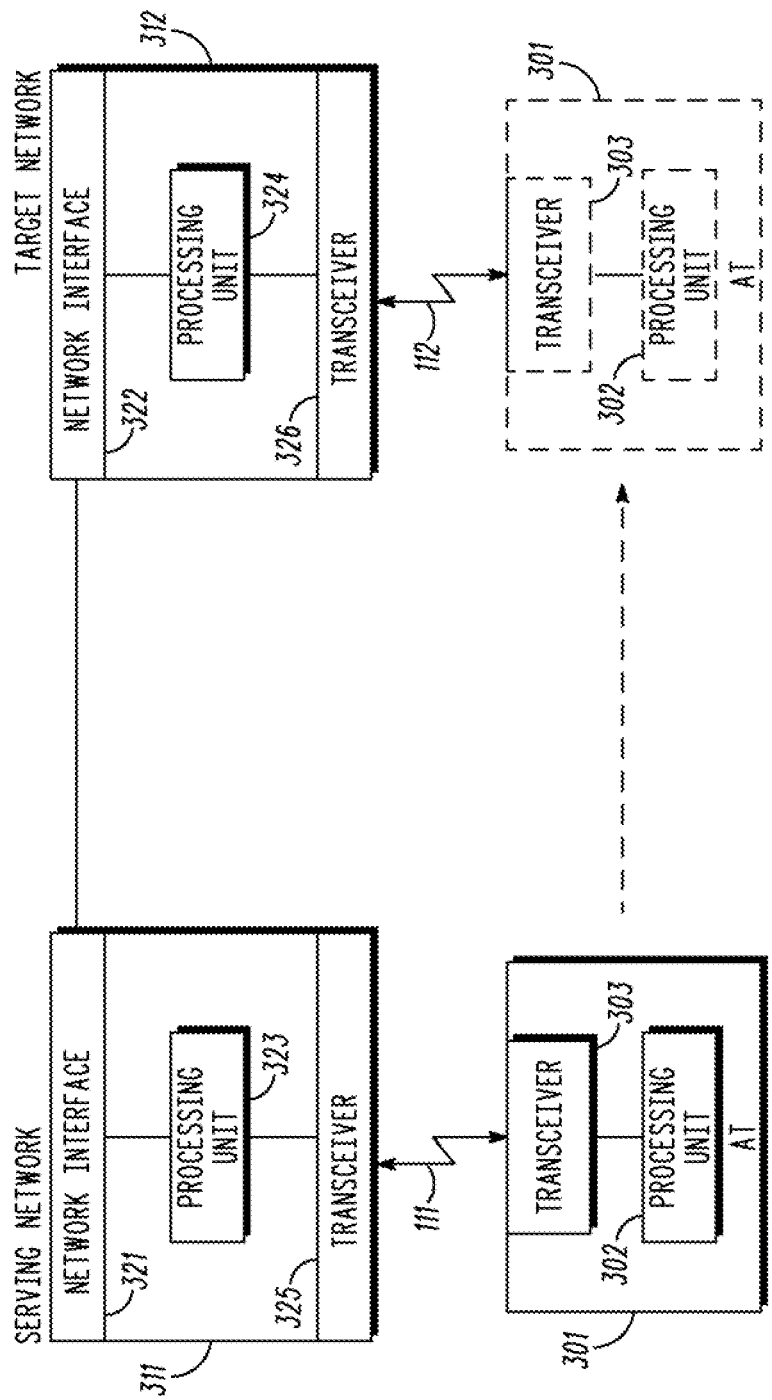
FIG. 3 is a more generalized block diagram depiction of a wireless communication system in accordance with multiple embodiments of the present invention.

FIG. 3 is a block diagram depiction of a wireless communication system 300 in accordance with multiple embodiments of the present invention. Communication system 300 is depicted in a more generalized manner than communication system 100. In particular, access terminal (AT) 301 and two networks are shown, serving network 311 and target network 312. Those skilled in the art will recognize that FIG. 3 does not depict all of the physical fixed network components necessary for system 300 to operate but only those system components and logical entities particularly relevant to the description of embodiments herein.

For example, FIG. 3 depicts networks 311-312 as respectively comprising transceivers 325-326, network interfaces 321-322, and processing units 323-324. In general, components such as processing units, network interfaces and transceivers are well-known. For example, network processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given an algorithm, a logic flow, a messaging/signaling flow, and/or a protocol specification, those skilled in the art are aware of the many design and development techniques available to implement a network processing unit that performs the given logic. Therefore, networks 311-312 represent known networks that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, the network aspects of the present invention may be implemented in/across one or more of the following components: a BTS, a BSC, an AN, and/or an MSC.

Thus, in certain embodiments, such as those in which system 100 components are mapped onto the generalized system 300 depiction, the network representing the 1X system (either network 311 or network 312, depending on which is the serving network) may comprise MSC 151 (or a portion thereof) and circuit node 121 (or a portion thereof). In such an embodiment, then, networking interface 321 (or 322) and processing unit 323 (or 324) may be respectively distributed across corresponding aspects of MSC 151 and circuit node 121. A more general example, then, would be transceivers 325-326, network interfaces 321-322, and/or processing units 323-324 being distributed across corresponding aspects of one or more of the following components: a BTS, a BSC, an AN, and/or an MSC.

Networks 311 and 312 respectively use air interfaces comprising channel groups 111 and 112 for communication with AT 301. In 3GPP2 embodiments, channel groups 111 and 112 each comprise traffic channels, which are dynamically assigned and de-assigned to support user services, and a variety of well-known non-traffic channel types, such as broadcast channels, paging channels, access channels and common control channels, all in accordance with the particular 3GPP2 signaling technology used. For example, channel groups 111 and 112 may respectively comprise a 1X channel group and an HRPD channel group, or vice versa.

Access terminals (ATs), or remote units, may serve as mobile stations (MSs); however, ATs are not necessarily mobile nor able to move. Also, remote units/ATs may be wireless devices but they do not necessarily need to be wireless; a remote unit/AT may be either wired or wireless. Moreover, remote unit/AT platforms are known to refer to a wide variety of consumer electronic platforms such as, but not limited to, mobile stations (MSs), user equipment (UE), terminal equipment, gaming devices, personal computers, personal digital assistants (PDAs), cable set-top boxes and satellite set-top boxes. In particular, AT 301 comprises processing unit 302, transceiver 303, a keypad (not shown), a speaker (not shown), a microphone (not shown), and a display (not shown). Processing units, transceivers, keypads, speakers, microphones, and displays as used in ATs are all well-known in the art.

For example, AT processing units are known to comprise basic components such as, but neither limited to nor necessarily requiring, microprocessors, digital signal processors (DSPs), microcontrollers, memory devices, application-specific integrated circuits (ASICs), and/or logic circuitry. Such AT components are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, AT 301 represents a known AT that has been adapted, in accordance with the description herein, to implement embodiments of the present invention.

Operation of various embodiments in accordance with the present invention occur substantially as follows. Relevant operation of some of the embodiments illustrated by FIG. 3 begins with AT 301 being registered with both networks 311 and 312 but being served by serving network 311. Thus, AT processing unit 302 is obtaining communication service from serving network 311 via AT transceiver 303 and network processing unit 323 is providing communication service to AT 301 via network transceiver 325. This communication service being provided to AT 301 by serving network 311 may take various forms depending on AT 301's service state. For example, AT 301 may be involved in a service via a traffic channel of air interface 111 (e.g., a busy service state) or merely monitoring a paging or broadcast channel of air interface 111 (e.g., an idle service state). Thus, communication service of various forms is provided AT 301 by serving network 311 via air interface 111. Having a desire to provide service to AT 301, target network 312 requests AT 301 for service via network interface 322 and serving network 311. Target network 312 may determine that a communication session (or service connection) with the AT is desirable in response to receiving signaling for a service involving the AT such as a circuit-switched service or a packet data service.

For example, in the case in which serving network 311 is a 1X network and target network 312 an HRPD network, a packet data service such as a packet data call request for AT 301 could be received by target network 312 (e.g., data arriving for delivery to AT 301). In another example in which serving network 311 is an HRPD network and target network 312 a 1X network, a circuit-switched service such as a circuit-switched call request for AT 301 could be received by target network 312, thereby creating the need for a communication session with AT 301.

Thus, serving network processing unit 323 receives a message from target network 312 via network interface 321 requesting to provide communication service to AT 301. Depending on the embodiment and/or the particular scenario at hand, the message requesting to provide service may take the form of a service request or a paging request message. Signaling 408 (FIG. 4) and signaling 504 (FIG. 5), both A1-BS Service Request messages, are examples of service request messages, while signaling 603 (FIG. 6) and signaling 1006 (FIG. 10) are examples of paging request messages.

In some embodiments in response to receiving the message requesting to provide communication service to AT 301, serving network 311 pages (i.e., generally notifies in some manner) AT 301. AT processing unit 302 receives the page (i.e., notification) via transceiver 303, and depending on the embodiment may respond by indicating that resource reservation is requested. AT processing unit 302, via transceiver 303, may send an indication that resource reservation is requested, for the communication service that is to be provided by target network 312, before AT 301 leaves the communication service of serving network 311. In other words, AT 301 may be trying to ensure that target network 312 will have the resources required to provide the service for which AT 301 is being requested, before AT 301 drops a communication service (such as an ongoing call) being provided by serving network 311.

Depending on the embodiment, in response to receiving the message from target network 312 requesting to provide communication service to AT 301, serving network 311 sends an indication to target network 312 that resource reservation is requested. This indication may be sent in response to receiving a resource reservation request from AT 301 (e.g., after paging/notifying AT 301) or as a result of a determination by serving network 311 that resource reservation is desirable (perhaps before paging/notifying AT 301). For example, AT 301 may have previously subscribed to resource reservation via serving network 311 or AT 301 may be actively involved in a communication service via serving network 311 (such as a call). Thus, processing unit 323 may determine to send an indication to target network 312 that resource reservation is requested either before or after paging/notifying AT 301. Signaling 505 (FIG. 5), an A1-BS Service Response message, and signaling 605 (FIG. 6), a Paging Response message (which could alternatively be a Clear Request message), are examples of indications that resource reservation is requested. FIG. 12 is a block diagram (1200) depicting an illustrative message definition for a paging response message, a Paging Response message in particular, that includes an element ("RR REQUEST") for indicating whether resource reservation is requested.

In response to receiving via network interface 322 an indication that resource reservation is requested, target network processing unit 324 reserves at least one communication resource in anticipation of providing service to AT 301. Depending on the embodiment and the particular communication service that target network 312 seeks to provide to AT 301, communication resources such as an air interface traffic channel and/or a network bearer resource, such as an A8 connection, an A10 connection, terrestrial circuits, or SCCP resources, may be reserved.

After reserving resources (and depending on the embodiment this may occur in response to various events), target network processing unit 324, via network interface 322, may indicate to serving network 311 that resource reservation has occurred in anticipation of providing service to AT 301. Signaling 408 (FIG. 4) and signaling 509 (FIG. 5), both A1-BS Service Request messages, and signaling 1006 (FIG. 10) and signaling 608 (FIG. 6), both Paging Request messages, are examples of indications that resource reservation has occurred. In addition, FIG. 8 is a block diagram (800) depicting an illustrative message definition for a service request message, a BS Service Request message in particular, that includes an element ("RR INDICATION") for indicating whether anticipatory resource reservation has occurred. Similarly, FIG. 11 is a block diagram (1100) depicting an illustrative message definition for a paging request message, a Paging Request message in particular, that includes an element ("RR INDICATION") for indicating whether anticipatory resource reservation has occurred.

Serving network processing unit 323, via network interface 321, receives the indication that resource reservation has occurred in anticipation of providing service to AT 301. Depending on the embodiment, processing unit 323 may proceed with paging/notifying AT 301, via transceiver 325, for the communication service to be provided by target network 312, in response to receiving the indication that resources have been reserved. However, paging/notifying AT 301 need not be in response to an indication of resource reservation, although from an AT user's perspective this may be desirable.

In general, resource reservation by a target network may be triggered by the occurrence of any one of a variety of events in conjunction with the target network determining that a communication session with an AT is desirable. Examples of triggering events include the following: the AT subscribing for resource reservation as a matter of configuration, the AT having a particular call state (such as busy, e.g.) and perhaps with regard to particular services (such as a voice or data call, e.g.), the AT requesting resource reservation (before or after being paged/notified of the target network's request to provide service, the communication session for which the target network is requesting the AT is of a particular type (e.g., a packet data service type, examples of which might include a voice over internet protocol (VoIP) call and/or a video telephony (VT) call), and/or resource reservation is default system operation. Various specific embodiments which involve conveying information about these triggering events and/or further defining these triggering events for particular networks and technologies have been provided above and will be added to in the discussion that follows.

The timing of and manner in which information about particular triggering events is communicated (or indicated) in a system is highly specific to each embodiment, and many possibilities exist. For example, some embodiments employ the use of a message such as an event notification message. FIG. 7 is a block diagram depicting an illustrative message definition for an event notification message in accordance with multiple embodiments of the present invention. Messaging blocks 710 and 720 depict the "EVENT" element and some detail of its makeup. Messaging block 730 provides an illustrative list of "EVENT IDENTIFIERS" that may be used; however, this list is merely an example. A subset of the list may be used, additional event indicators may be added, an altogether different list of event indicators may be used, or event indicators may be incorporated into messaging other than the dedicated messaging that the event notification message represents. For example, certain event indicators may be added to certain other signaling to indicate event information as that signaling is used. Signaling 401 (FIG. 4) and signaling 1002 (FIG. 10) are examples of event notification messaging being used.

Some examples of event indicators, whether incorporated into an event notification message or not, include the following: cross-paging-related configuration information for the AT, call state information for the AT, location information for the AT, and resource reservation subscription information for the AT. The cross-paging-related configuration information for the AT may include the resource reservation subscription information or somehow, and perhaps additionally, indicate how resource reservation is to be handled for the AT. The cross-paging-related configuration information may be sent by the AT to the serving network upon arrival of the AT in the serving network, and if not sent sooner, may be sent to the target network in response to the target network's request of the serving network to page the AT.

The call state information for the AT may include information indicating call states such as a busy call state, an idle call state, an active packet data session state, and/or a dormant packet data session state. Other call states could be added, of course, and information indicating the present call state of the AT in the serving network may be sent to the target network in response to the present call state of the AT changing. In other words, the serving network may keep the target network apprised of call state changes for the AT in order to enable the target network to make resource reservation decisions.

Information indicating the location of the AT in the serving network may also be sent to the target network. For example, an indication of which cell is serving the AT may be sent. The target network may then use the AT location information in order to more efficiently reserve resources. For example, fewer air interface and/or network bearer resources may need to be reserved by the target network if sufficient location information can be provided for the AT.

In addition to or instead of an event notification message, location information for the AT may be sent in a service response message. FIG. 9 is a block diagram (900) depicting an illustrative message definition for a service response message in accordance with multiple embodiments of the present invention. Block diagram 900 depicts the "LOCATION INFORMATION" element of an illustrative BS Service Response message along with some of its other elements. Signaling 505 (FIG. 5) is an example of such a BS Service Response message being used.

Figure 4:
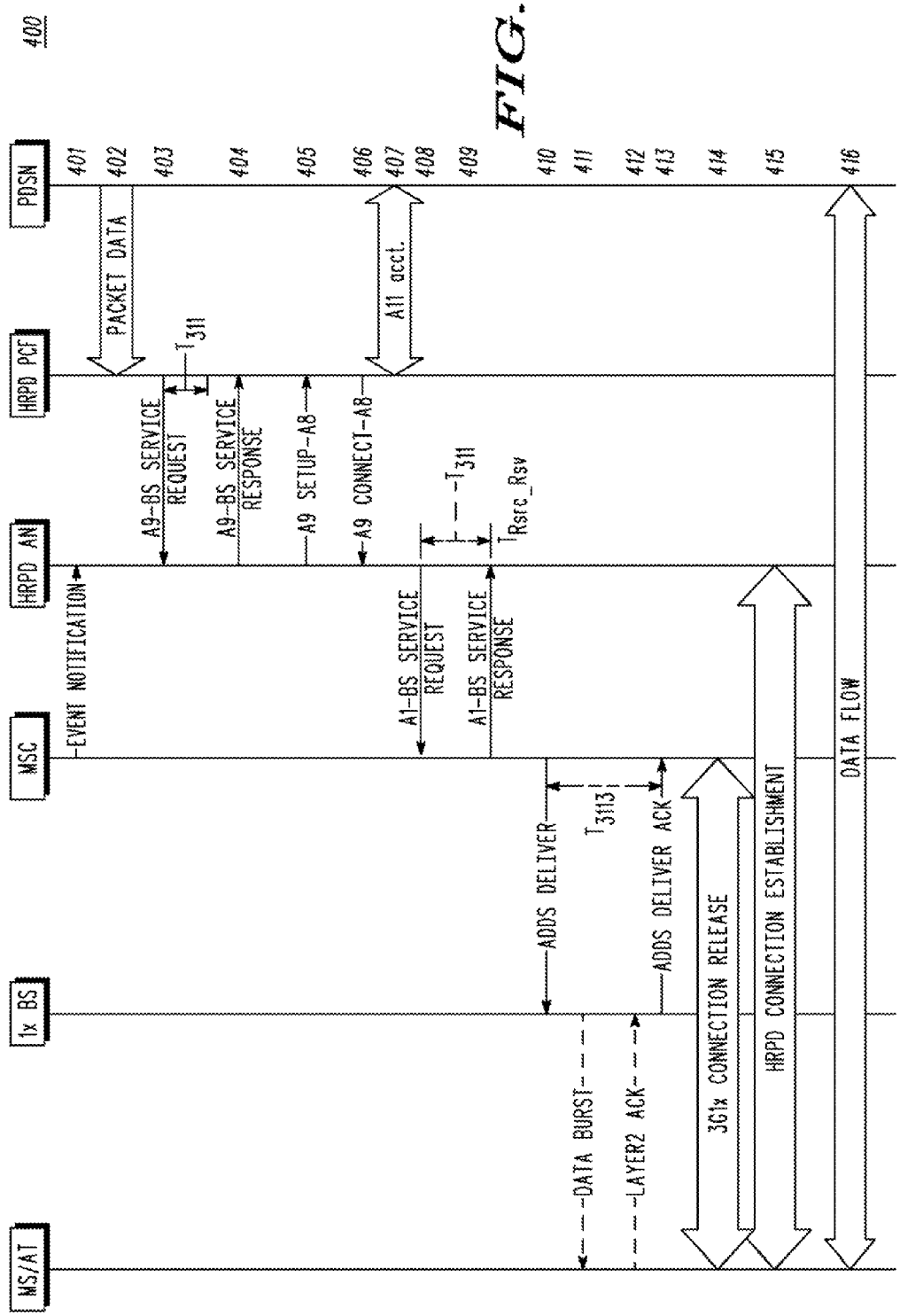
FIG. 4 is a signaling flow diagram depicting a HAT being cross paged for HRPD packet data service via a 1x network air interface in accordance with multiple embodiments of the present invention.
Figure 5:
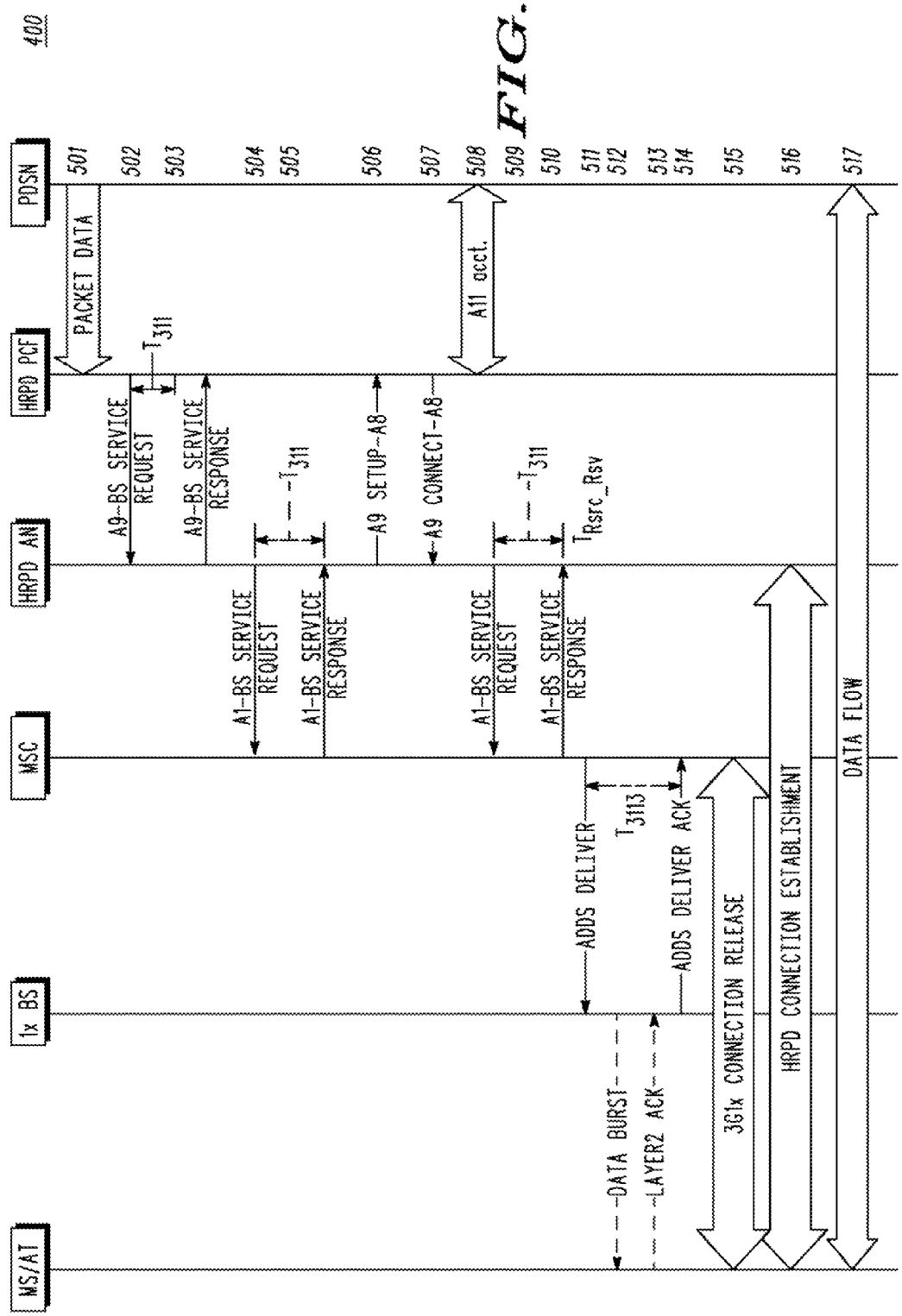
FIG. 5 is a signaling flow diagram depicting a HAT being cross paged for HRPD packet data service via a 1x network air interface in accordance with multiple embodiments of the present invention.

FIGS. 4, 5, 6 and 10 are detailed signaling flow diagrams that will be used in the following description of some specific embodiments. These embodiments are provided in such detail in order to illustrate and describe some specific implementations of various aspects of the present invention, the scope of the present invention being defined by the appended claims. FIGS. 4 and 5 are signaling flow diagrams (400 and 500) that depict a HAT being cross paged for HRPD packet data service via a 1x network air interface in accordance with multiple embodiments of the present invention. The descriptions of diagrams 400 and 500 refer to the following list of HRPD cross paging triggers:

1. MSC provides indication that HAT is subscribed for guaranteed resource reservation (HLR configuration). The indication could be sent (a) once when the HAT arrives in the 1x network or (b) when the HAT is paged for HRPD packet data service
2. HRPD RAN sends HRPD cross-page request to 3G1x circuit network. MSC responds with an indication that HAT is currently busy with a 1x circuit call. HRPD network initiates resource reservation and reinitiates cross-paging in the 1x network with a guaranteed resource indication to MSC.
3. Tunneled HRPD air interface signaling message requesting resource reservation from the HAT is received at HRPD AN/PCF (a) prior to or (b) after being paged.
4. In response to an indication from PDSN of incoming VoIP or VT call.
PDSN determines this when the packet data for the HAT arrives from a SIP server and signals information to HRPD RAN.
5. 1x RAN sends an indication to HRPD AN when HAT is engaged in a 1x circuit call.
6. HRPD RAN always guarantees network resources prior to cross-paging HAT for HRPD packet data service in circuit network.

The following is a detailed description of the signaling flow of diagram 400 by reference number:
401) HAT is currently in the 1x network. MSC sends an Event Notification message to the HRPD network (AN or PCF) containing at least one of the following pieces of information (may not be sent for triggers 4,6)
  1. HAT is subscribed for guaranteed resource reservation (1a)
  2. HAT is busy with a 1x circuit voice call (5)
  3. HAT has requested resource reservation (3a)
  The MSC may include the HATs current location information in the message, if available, to facilitate resource reservation.
402) Packet data arrives for the HAT at the packet data session anchored at the HRPD network while the MS is engaged in a circuit voice call on the 1x network. A field in GRE header may indicate packet data that may required resource reservation (Trigger 4, e.g. VT, VoIP)
403) HRPD PCF sends A9-BS Service Request message to the HRPD AN.
404) HRPD AN responds with an A9-BS Service Response message to HRPD PCF.
In response to one of the triggers described above, the HRPD network performs steps e, f, g before requesting a cross page from the 1x network.
405) HRPD AN sends an A9-Setup-A8 message to HRPD PCF request an A8 bearer connection.
406) HRPD PCF responds with A9-Connect-A8 after allocating an A8 bearer connection.
407) The HRPD AN reserves a traffic channel for the HAT's packet data call and exchanges A11-Registration Request/A11-Registration Response containing Active Start AL record to the PDSN
408) HRPD AN sends an A1-BS Service Request message to the MSC to request the MSC to page the HAT for packet data service. The message may include an indication that resources have been reserved for the HAT in the HRPD network (to prevent 'ghost ring'). The AN starts timer TRsrc-Rsv
409) The 1X MSC responds with an A1-BS Service Response to HRPD RAN. The HRPD RAN stops timer $T_{311}$.
410) MSC sends an A1-ADDS Deliver message to the 1xBS to page the HAT for HRPD packet data service.
411) 1xBS sends a data burst message containing a Page message for HRPD packet data service containing and the HRPD service option to the HAT.
412) HAT responds with a Layer 2 Ack
413) 1xBS sends an ADDS Deliver Ack message to MSC.
414) The HAT ends its 1x circuit call and releases the connection with the 1x RAN.
415) The HAT re-establishes an HRPD connection with the HRPD RAN. The AN cancels timer TRsrc-Rsv.
416) Packet data begins to flow between the AT and HRPD network.

The following is a detailed description of the signaling flow of diagram 500 by reference number:
501) Packet data arrives for the HAT at the packet data session anchored at the HRPD network while the MS is engaged in a circuit voice call on the 1x network.
502) HRPD PCF sends A9-BS Service Request message to the HRPD AN,
503) HRPD AN responds with an A9-BS Service Response message to HRPD PCF.
504) HRPD AN sends an A1-BS Service Request message to the MSC requesting it to page the HAT for packet data service.

505) In response to Trigger 1b (HAT is subscribed for resource reservation) or trigger 2 (HAT is engaged in a circuit voice call), MSC responds to HRPD AN with A1-BS Service Response requesting resource reservation for the call. MSC includes HAT location information to aid HRPD network in determining where resources should be reserved. Alternatively, AT is queried for the information.

506) HRPD AN sends an A9-Setup-A8 message to HRPD PCF request an A8 bearer connection.

507) HRPD PCF responds with A9-Connect-A8 after allocating an A8 bearer connection.

508) The HRPD AN reserves a traffic channel for the HAT's packet data call and exchanges A11-Registration Request/A11-Registration Response containing Active Start AL record to the PDSN 509) HRPD AN sends an A1-BS Service Request message to the MSC to request the MSC to page the HAT for HRPD packet data service. The message may include an indication that resources have been reserved for the HAT in the HRPD network (to prevent 'ghost ring'). The AN starts timer TRsrc-Rsv.

510) The 1X MSC responds with an A1-BS Service Response to HRPD RAN. The HRPD RAN stops timer $T_{311}$.

511) MSC sends an A1-ADDS Deliver message to the 1xBS containing an HRPD Page Request sent by the HRPD AN.

512) 1xBS sends a data burst message containing a Page message for HRPD packet data service containing and the HRPD service option to the HAT.

513) HAT responds with a Layer 2 Ack 514) 1xBS sends an ADDS Deliver Ack message to MSC.

515) The HAT drops its 1x circuit call and releases connection with the 1x RAN.

516) The HAT re-establishes an HRPD connection with the HRPD RAN. The AN cancels timer TRsrc-Rsv.

517) Packet data begins to flow between the AT and HRPD network.

Figure 6:
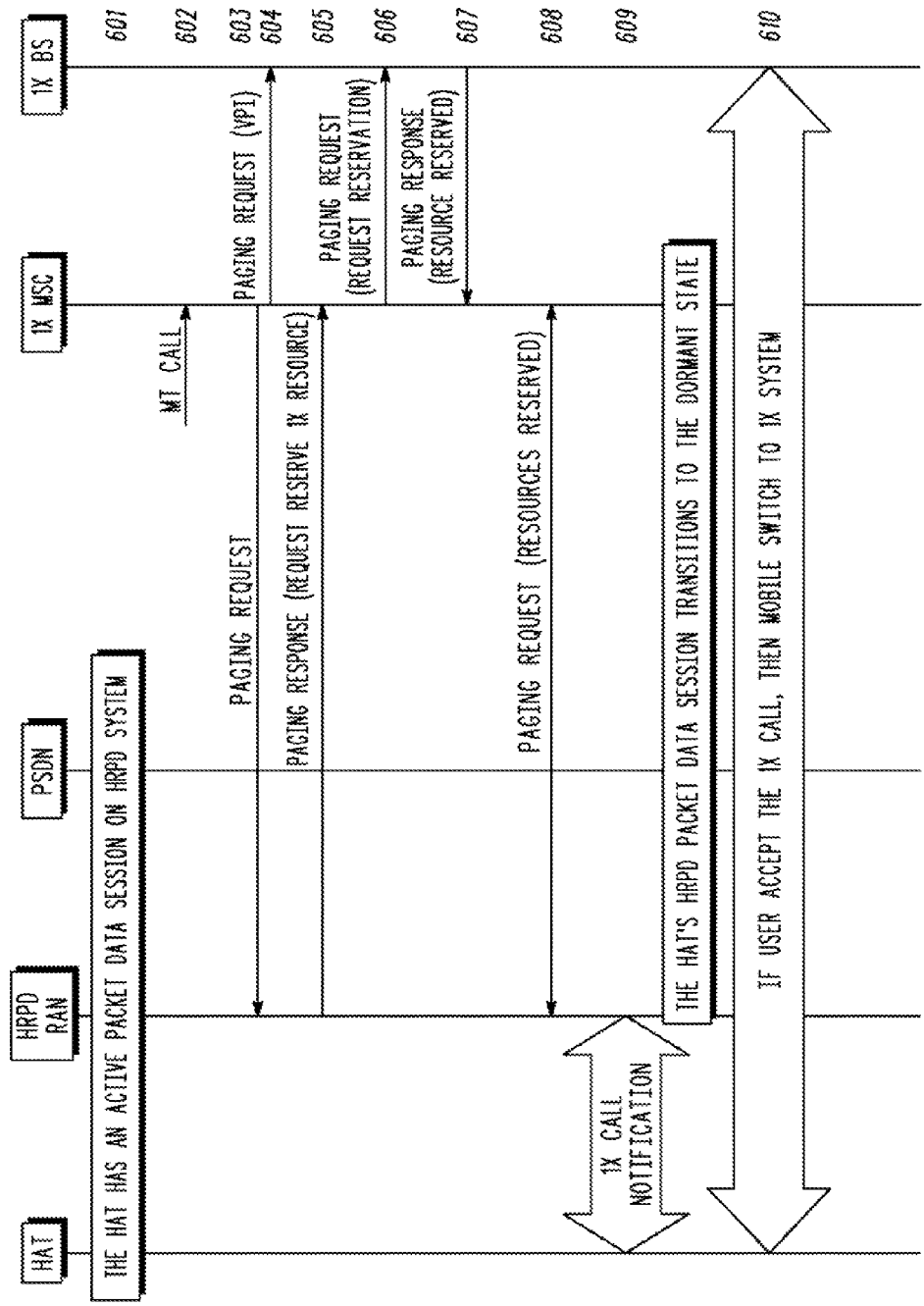
FIG. 6 is a signaling flow diagram depicting a HAT being cross paged for 1x service via an HRPD air interface in accordance with multiple embodiments of the present invention.
Figure 10:
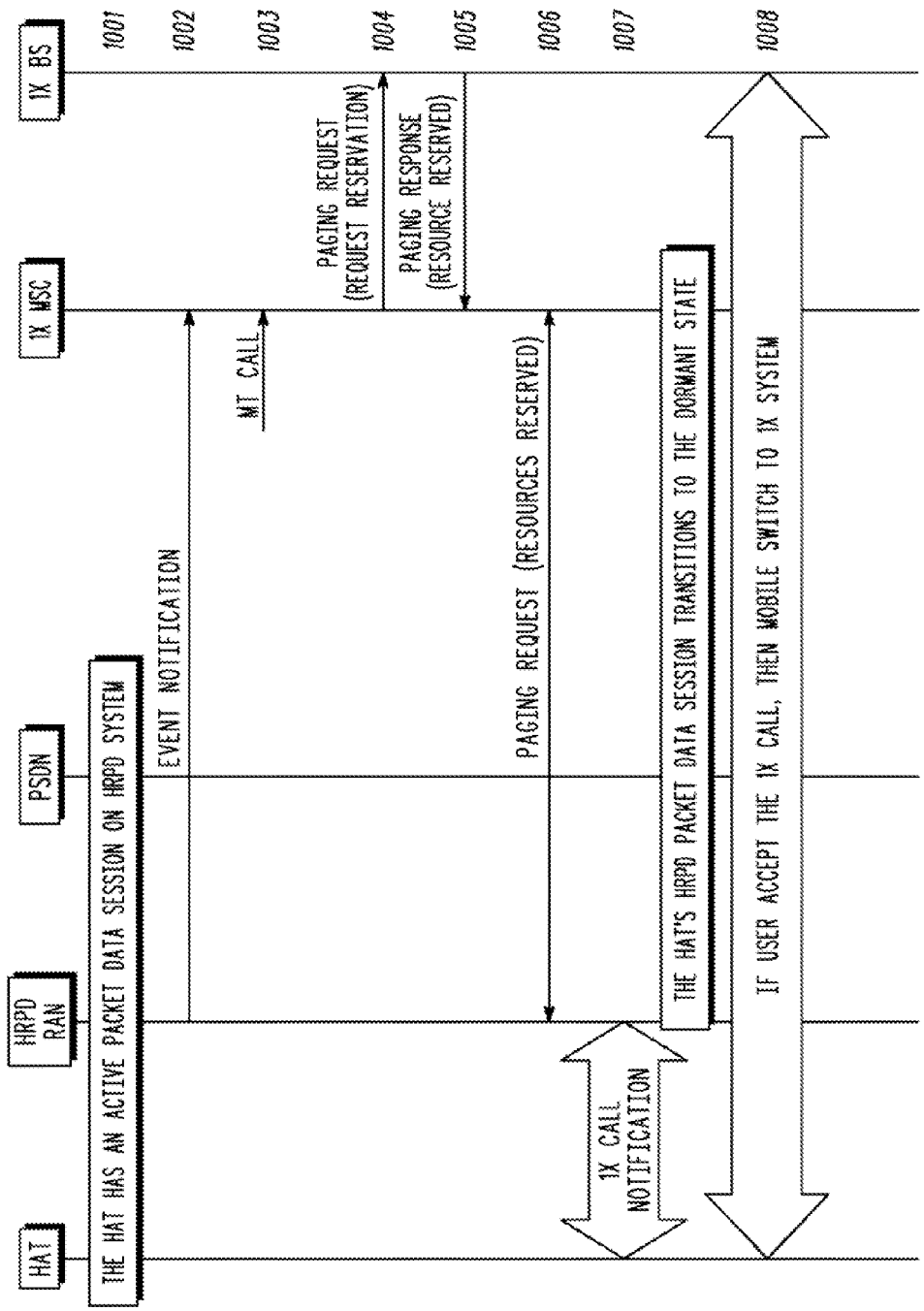
FIG. 10 is a signaling flow diagram depicting a HAT being cross paged for 1x service via an HRPD air interface in accordance with multiple embodiments of the present invention.

FIGS. 10 and 6 are signaling flow diagrams (1000 and 600) that depict a HAT being cross paged for 1x service via an HRPD air interface in accordance with multiple embodiments of the present invention. The descriptions of diagrams 1000 and 600 refer to the following list of 3G1X cross paging triggers:

1. HAT's subscriber profile indicates HAT is subscribed for guaranteed resource reservation (HLR configuration). The indication could be sent (a) once when the HAT arrives in the HRPD network or (b) when the HAT is paged for 1X circuit voice service
2. 3G1X circuit network sends 1x cross-page request to HRPD network. HRPD network responds with indication that HAT is engaged in an active packet data session call (data actively being exchanged between HAT and packet data network, i.e a traffic channel is assigned and there is an air interface connection).
3. Circuit network reserves network resources and re-pages HAT on HRPD network for circuit voice call in response to tunneled air interface signaling from HAT requesting resource reservation (a) prior to or (b) after being paged.
4. HRPD network informs 1x network in real-time whenever HAT's session transitions from the dormant to the active state. (note this is different than trigger '2'). 3G1X network reserves network resources prior to cross-paging HAT for 1x circuit service whenever HAT is engaged in a packet data session.
5. 3G1X RAN always guarantees resources before cross-paging HAT for 1x circuit voice in HRPD packet data network.

The following is a detailed description of the signaling flow of diagram 1000 by reference number:

1001) The mobile is in an active packet data session on HRPD system.

1002) HRPD RAN sends an Event Notification message to the 1X MSC containing at least one of the following pieces of information (may not be sent for trigger 5)
  1. HAT is subscribed for guaranteed resource reservation (1a)
  2. HAT is requesting resource reservation (3a)
  3. HAT has transitioned to the packet data active state (4)
The HRPD RAN also includes the HATs current location information in the message, if available, to facilitate resource reservation.

1003) The 1X MSC receives a voice call from the circuit core network destined for the mobile.

1004) 1X MSC send a 3G1x Paging Request message to the 1X BSC (may include the HAT's location information, if available, to facilitate resource reservation). The Paging Request includes a field indicating resource shall be reserved for the mobile. The 1x BS reserves network resources including air interface traffic channels for the HAT.

1005) After 1X RAN allocates network resources and radio traffic channel for HAT, it then responds with a Paging Response message to 1X MSC. The Paging Response message contains an indication that resources have been reserved for the HAT.

1006) 1X MSC sends Paging Request to HRPD RAN indicating that 1X network resources have been reserved.

1007) HRPD RAN pages the HAT for the 1X call via CSNA.

1008) If user accept the 1X call, the HAT transitions to the dormant packet data state and switches to 1X system for the HAT terminated voice call.

The following is a detailed description of the signaling flow of diagram 1000 by reference number:

601) The mobile is in an active packet data call on HRPD system.

602) The 1X MSC receives a voice call from the circuit core network destined for the mobile.

603) Since 1X MSC knows that the HAT is in the HRPD network, 1X MSC send a 3G1x Paging Request message to HRPD RAN.

604) 1X MSC also sends a 3G1X Paging Request message to 3G1x BS with VPI included.

605) HRPD RAN indicates that the 1X resource needs to be reserved for the HAT before paging it in the HRPD network, the HRPD RAN responds with a Paging Response message to 1X MSC indicating "Request Reserve 1X resource".

606) Upon receipt of the Paging Response from HRPD RAN, 1X MSC sends a Paging Request message indicating that reserved resources are required in the 1X RAN. When the 1X RAN receive the Paging Request, it reserves network resources and air interface traffic channel for the HAT.

607) 1X BS allocates network resources and radio traffic channel for HAT, then responds with a Paging Response message to 1X MSC. The Paging Response message contains a field indicating that the resource has been reserved for the HAT.

608) 1X MSC sends Paging Request to HRPD RAN indicating that 1X network resources have been reserved.
609) HRPD RAN pages the HAT for the 1X call via CSNA.
610) If user accept the 1X call, the HAT transitions to the dormant packet data state and switches to 1X system for the HAT terminated voice call.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method to facilitate cross-paging in a multi-network communication system, the method comprising:
an access terminal establishing a first call in a serving network; the access terminal receiving a page from a target network, the page requesting to establish a second call in the target network, wherein the second call is different from the first call
in response to receiving the page and before terminating the first call, the access terminal requesting resource reservation at the target network for the second call; and
receiving a page from the serving network indicating that at least one communication resource has been reserved at the target network for the second call.

2. A method for cross-paging in a multi-network communication system, the method comprising:
requesting, by a target network via a serving network, establishment of a second communication service with an access terminal (AT), wherein the AT is currently engaged in a first communication service in the serving network;
in response to requesting, the target network receiving from the serving network information indicating a present call state of the AT in the serving network;
in response to receiving, establishing, by the target network, a connection with the AT to support the second communication service; and
sending, by the target network to the serving network, an indication that at least one communication resource has been reserved in anticipation of providing the second communication service to the AT.

3. The method of claim 2, further comprising
determining, by the target network, that a communication session with the AT is desirable, wherein determining that the communication session with the AT is desirable comprises receiving signaling for at least one type of service related to the AT from the group consisting of
a circuit-switched service and
a packet data service.

4. The method of claim 2 wherein before the target network establishes a connection with the AT to support the second communication service, the method comprises reserving, by the target network, at least one communication resource in anticipation of establishing the second communication service with the AT; and
indicating to the serving network by the target network after reserving, that at least one communication resource has been reserved in anticipation of providing service to the AT.

5. The method of claim 2, wherein requesting by a target network via a serving network, establishment of a second communication service with an AT comprises sending a message from the group of messages consisting of a service request message and a paging request message.

6. The method of claim 2 further comprising:
reserving at least one communication resource from a group of resources consisting of at least one air interface traffic channel and at least one network bearer resource, and
wherein the at least one network bearer resource comprises at least one network bearer resource from a group consisting of an A8 connection, an A10 connection, terrestrial circuits, and SCCP resources.

7. The method of claim 2, wherein the present call state comprises a call state from the group consisting of
a busy call state,
idle call state;
active packet data session state, and
dormant packet data session state.

8. A method for cross-paging in a multi-network communication system, the method comprising:
providing a first communication service to an access terminal (AT) by a serving network;
receiving, by the serving network, a page from a target network requesting to provide a second communication service to the AT, while the AT is in the first communication service with the serving network;
in response to receiving the page from the target network, the serving network sending information indicating a present call state of the AT in the serving network;
receiving an indication, by the serving network from the target network, that at least one communication resource has been reserved in anticipation of providing the second communication service to the AT; and in response to receiving an indication from the target network, the service network paging the access terminal for the communication service to be provided by the target network.

9. The method of claim 8 wherein sending information indicating the present call state of the AT in the serving network comprises sending a message from the group of messages consisting of an event notification, a service response message, a paging response message, and a clear request message.

10. The method of claim 8, wherein the present call state comprises a call state from the group consisting of
 a busy call state,
 idle call state;
 active packet data session state, and
 dormant packet data session state.

11. The method of claim 8, wherein sending information indicating the present call state of the AT in the serving network comprises sending information indicating the present call state of the AT in response to the present call state changing.

12. An access terminal (AT) comprising:
 a transceiver;
 a processing unit, communicatively coupled to the transceiver, the process unit adapted to
 establish a first call in a serving network;
 receive a page from a target network, the page requesting to establish a second call in the target network;
 in response to receiving the page and before terminating the first call, the access terminal requesting resource reservation at the target network for the second call; and
 receive a page from the serving network indicating that at least one communication resource has been reserved at the target network for the second call.

* * * * *